United States Patent
DeBlasi et al.

(10) Patent No.: US 9,234,609 B1
(45) Date of Patent: *Jan. 12, 2016

(54) ABRASION-RESISTANT BRAIDED HOSE

(71) Applicants: Italo DeBlasi, Pierson, FL (US); Josif Atanasoski, Ormond Beach, FL (US)

(72) Inventors: Italo DeBlasi, Pierson, FL (US); Josif Atanasoski, Ormond Beach, FL (US)

(73) Assignee: Microflex, Inc., Ormond Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/725,378

(22) Filed: May 29, 2015

Related U.S. Application Data

(63) Continuation of application No. 14/549,939, filed on Nov. 21, 2014, now Pat. No. 9,091,375.

(60) Provisional application No. 62/033,370, filed on Aug. 5, 2014.

(51) Int. Cl.
*F16L 11/10* (2006.01)
*F16L 11/02* (2006.01)
*F16L 11/04* (2006.01)
*F16L 11/12* (2006.01)

(52) U.S. Cl.
CPC ............... *F16L 11/02* (2013.01); *F16L 11/04* (2013.01); *F16L 11/122* (2013.01)

(58) Field of Classification Search
CPC ....... F16L 11/085; F16L 11/087; F16L 11/15; F16L 33/20; F16L 33/2076
USPC ............. 138/123–126, 129, 140, 137, 141, 138/DIG. 3
See application file for complete search history.

(56) References Cited

U.S. PATENT DOCUMENTS

| | | | |
|---|---|---|---|
| 3,023,787 A | 3/1962 | Phillips et al. | |
| 3,190,315 A | 6/1965 | Taylor et al. | |
| 3,654,967 A | 4/1972 | Atwell et al. | |
| 3,857,415 A | 12/1974 | Morin et al. | 138/122 |
| 4,137,949 A | 2/1979 | Linko et al. | 138/125 |
| 4,190,088 A | 2/1980 | Lalikos et al. | 138/126 |
| 4,259,989 A | 4/1981 | Lalikos et al. | 138/109 |
| 4,259,991 A | 4/1981 | Kutnyak | 138/127 |
| 4,488,577 A | 12/1984 | Shilad et al. | 138/127 |
| 4,675,221 A | 6/1987 | Lalikos et al. | 138/110 |
| 5,381,511 A | 1/1995 | Bahar et al. | |
| 5,507,320 A | 4/1996 | Plumley | 138/126 |
| 5,782,270 A | 7/1998 | Goett et al. | 138/109 |
| 5,931,200 A | 8/1999 | Mulvey et al. | 138/109 |
| 6,286,557 B1 * | 9/2001 | May | 138/110 |
| 6,302,152 B1 | 10/2001 | Mulligan | |
| 6,334,466 B1 | 1/2002 | Jani et al. | |
| 7,114,526 B2 | 10/2006 | Takagi et al. | 138/127 |
| 7,588,057 B2 | 9/2009 | Bentley | |
| 2005/0211325 A1 | 9/2005 | Takagi et al. | 138/121 |

* cited by examiner

*Primary Examiner* — Patrick F Brinson
(74) *Attorney, Agent, or Firm* — Livingston Loeffler, P.A.; Edward M. Livingston, Esq.; Bryan L. Loeffler, Esq.

(57) ABSTRACT

An abrasion-resistant braided hose (1) having an abrasion-resistant layer (4) located between an inner hose (2) and a braiding covering (3). The abrasion-resistant layer is preferably a strip of Teflon® helically or spirally wrapped around the inner hose to allow for flexibility. The abrasion-resistant layer reduces the amount of friction between the inner hose and the braided covering, thereby reducing the likelihood of the inner hose rupturing and failing.

19 Claims, 2 Drawing Sheets

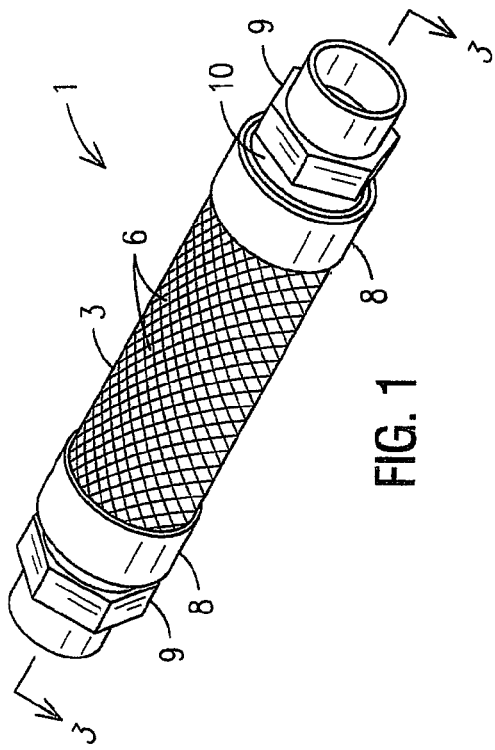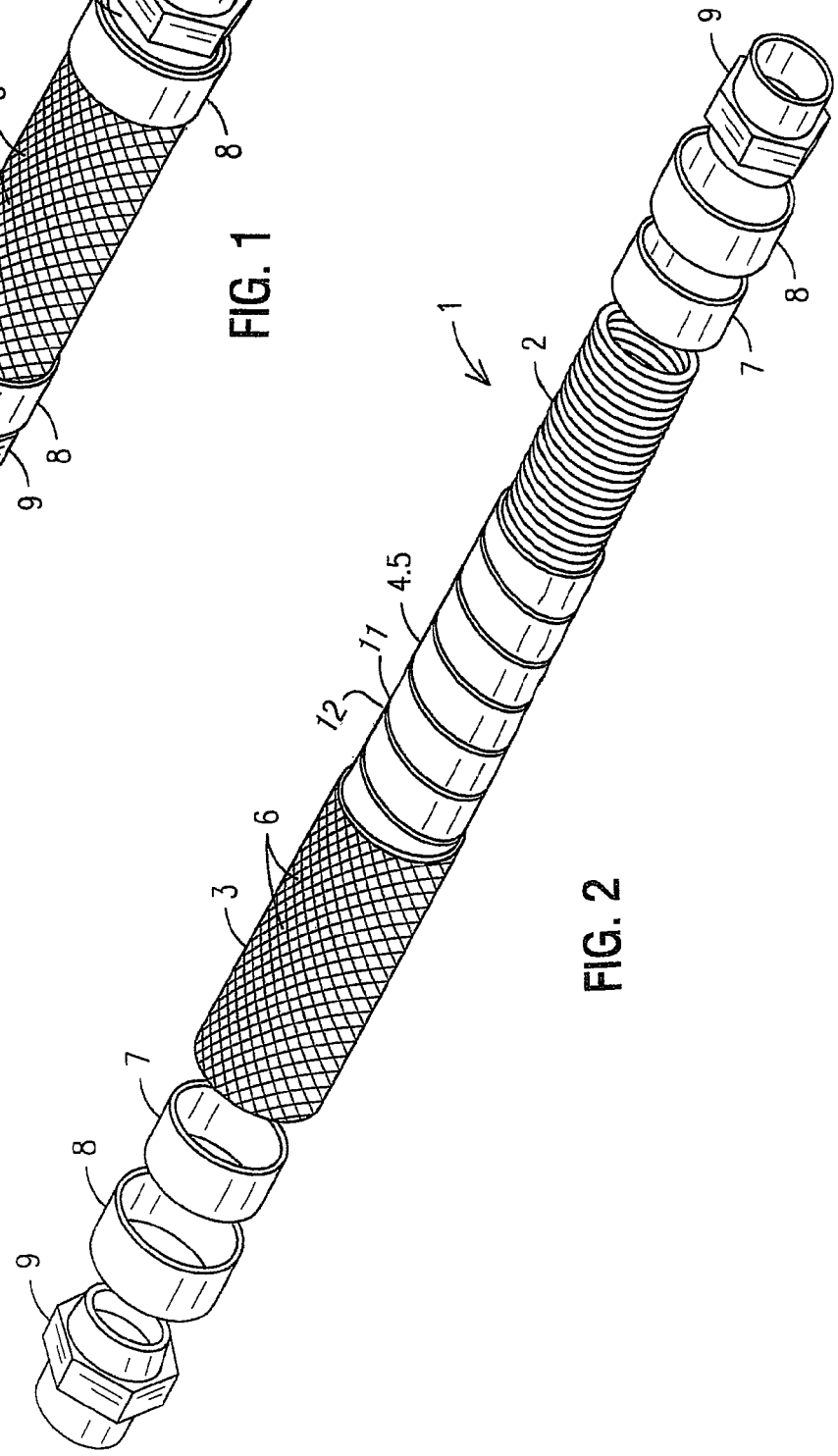

ABRASION-RESISTANT BRAIDED HOSE

CROSS-REFERENCE TO RELATED APPLICATION

This application is a continuation of application Ser. No. 14/549,939 filed on Nov. 21, 2014 which claims priority to application No. 62/033,370, filed on Aug. 5, 2014. . The patent applications identified above are incorporated herein by reference in their entirety to provide continuity of disclosure.

FIELD OF THE INVENTION

This invention relates to braided hoses and more particularly a hose having an abrasion-resistant middle layer located between a braided covering and an inner hose to protect the inner hose from ruptures caused from abrasions.

BACKGROUND OF THE INVENTION

Braided hoses are commonly used in industrial and other type applications as supply, drainage and/or exhaust lines. Such hoses normally have an inner hose made of rubber or metal (such as corrugated hoses) with an outer layer of braided metal threads. The threads may also be made of other material depending on the intended use of the hose and economic considerations.

Couplings are preferably located on each end of the hose. The method by which the braiding is attached to the couplings or connection fittings depends on the type of fitting and the demands on the hose.

The main purpose of braiding is to increase pressure resistance in the hose. Due to its inherent flexibility, the braiding moulds itself to the movement of the hose. Hose braiding consists of wrapped wire bundles that are alternately layered one over the other. This not only prevents hose lengthening due to internal pressure, but also absorbs external tensile forces and protects the outside of the hose. The braiding also greatly increases the resistance of the hose to internal pressure.

However, the constriction of the braiding upon the inner hose combined with rubbing caused when the braiding restrains the inner hose from elongation while the hose is under pressure and can cause the hose to rupture and fail.

Therefore, a need exists for an abrasion-resistant braided hose wherein the structural integrity of the inner hose is not compromised by the braiding surrounding the inner hose.

SUMMARY OF THE INVENTION

The primary object of the present invention is to provide an abrasion-resistant braided hose wherein the structural integrity of the inner hose is not compromised by the braiding surrounding the inner hose.

The present invention fulfills the above and other objects by providing an abrasion-resistant braided hose having an anti-abrasion non-restrictive layer located between an inner hose and a braiding covering. The abrasion-resistant layer is preferably a strip of Teflon® helically or spirally wrapped around the inner hose to allow for flexibility or may be a stripwound interlocking hose. In addition, the abrasion-resistant middle layer, or strip of material, is preferably spirally wrapped around the inner hose in such a manner as to create a gap between edges of the strip. A proper minimum gap allows for unrestrained movement or bending of the inner hose while still protecting the inner hose. The strip is preferably a thicker piece of material to ensure that the strip will not imbed between any convolutions. The abrasion-resistant layer reduces the amount of friction between the inner hose and the braided covering, thereby reducing the likelihood of the inner hose rupturing and failing, especially in situations where the abrasion-resistant braided hose is exposed to high vibrations and/or pulsating environments, for example, in use with compressors, reciprocating engines and so forth.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 1 is a perspective side view of an abrasion-resistant braided hose of the present invention;

FIG. 2 is an exploded perspective side view of an abrasion-resistant braided hose of the present invention.

DESCRIPTION OF THE PREFERRED EMBODIMENTS

Figure 3:
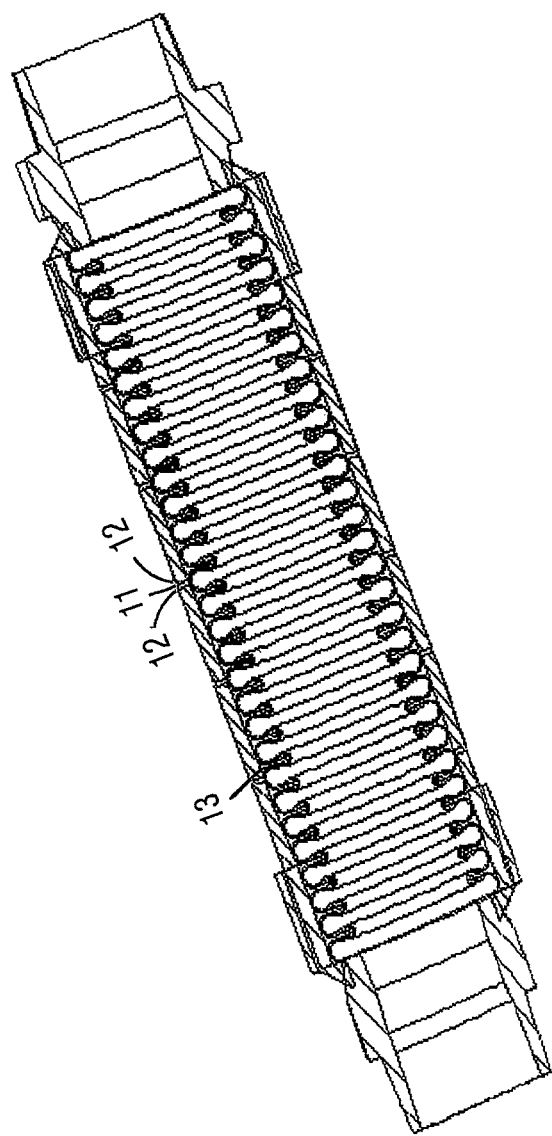
FIG. 3 is a side cross-sectional view along line 3-3 of FIG. 1 of the present invention.

For purposes of describing the preferred embodiment, the terminology used in reference to the numbered components in the drawings is as follows:

1. abrasion-resistant braided hose, generally
2. inner hose
3. braided covering
4. abrasion-resistant middle layer
5. strip
6. individual band
7. inner rings
8. braid rings
9. end fittings
10. seal
11. gap
12. edges of strip
13. convolution space With reference to FIGS. 1-3, the abrasion-resistant braided hose 1 comprises an inner hose 2, which may be a rubber hose, a metal hose, a strip wound hose, a corrugated hose (as illustrated here) or other types of hose. An outer braided covering 3 comprised of a plurality of braided threads surrounds the inner hose 2. An abrasion-resistant middle layer 4 is located between the braided covering 3 and the inner hose 2. The abrasion-resistant middle layer 4 is preferably a polytetrafluoroethylene, such as Teflon®, or other material that reduces friction between the inner hose 2 and the braided covering 3. As illustrated in FIG. 2, the abrasion-resistant middle layer 4 is an elongated strip 5 wrapped around the inner hose 2, thereby separating the inner hose 2 from the braided covering 3. The elongated strip 5 is wrapped in a helical or spiral pattern around the inner hose 2. The abrasion-resistant middle layer 4 may also have a coating of additional lubricant on an outer surface to further reduce friction between the inner hose 2, and the braided covering 3.

The assembly of the abrasion-resistant braided hose 1 is accomplished by cutting the inner hose 2 to a desired length. In addition, individual bands 6 of the braided covering 3 are cut to an appropriate length to be braided around the cut inner hose 2. The strip 5 forming the abrasion-resistant middle layer 4 is then wound around the inner hose 2 in a spiral fashion leaving space for inner rings 7 to be connected to ends of the inner tube 2.

The strip 5 forming the abrasion-resistant middle layer 4 is preferably spirally wrapped around the inner hose 2 in such a manner as to create gaps 11 between edges 12 of the strip 5. The gaps 11 allow for unrestrained movement or bending of the inner hose 2 while still protecting the inner hose 2. The strip gap 11 is designed to allow unrestricted bending of the inner hose 2. The size of the gap 11 may vary with hose size but preferably has a thickness and width the will span any convolution spaces 13 in the inner hose 2 (as illustrated in FIG. 3), which could cause the hose to lock-up.

The inner rings 7 are then connected or swaged in place to the ends of the inner hose 2. The braided covering 3 is then placed over the abrasion-resistant middle layer 4. Then, braid rings 8 are placed over ends of the braided covering 3 and the ends of the abrasion-resistant braided hose 1 are sealed preferably by seals 10, such as welds. End fittings 9, such as a threaded end fittings, flanged end fittings, welded end fittings and so forth, are then secured to the ends of the abrasion-resistant braided hose 1, preferably by welding.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, we claim:

1. An abrasion-resistant braided hose comprising:
an elongated inner hose having two ends;
an outer braided covering surrounding the inner hose;
an abrasion-resistant middle layer located between the braided covering and the inner hose;
the abrasion-resistant middle layer is an elongated strip wrapped around the inner hose;
inner rings connected to the ends of the inner hose; and
the abrasion-resistant middle layer located between the braided covering and the inner hose terminating a predetermined distance from the ends of the inner hose to leave space for the inner rings to be connected to the ends of the inner hose.

2. The abrasion-resistant braided hose of claim 1 wherein:
the abrasion-resistant middle layer is made of polytetrafluoroethylene.

3. The abrasion-resistant braided hose of claim 1 wherein:
said elongated strip has a gap located between edges of the strip to allow for bending of the inner hose.

4. The abrasion-resistant braided hose of claim 1 wherein:
said elongated strip having a thickness and width that prevents the elongated strip from conforming to any convolution spaces located on the inner hose.

5. The abrasion-resistant braided hose of claim 1 further comprising:
inner rings connected to the ends of the inner hose.

6. The abrasion-resistant braided hose of claim 1 further comprising:
braid rings connected to the ends of the braided covering.

7. The abrasion-resistant braided hose of claim 1 further comprising:
end fittings secured to the ends of the abrasion-resistant braided hose.

8. An abrasion-resistant braided hose comprising:
an elongated inner hose having two ends;
an outer braided covering surrounding the inner hose;
an abrasion-resistant middle layer located between the braided covering and the inner hose;
the abrasion-resistant middle layer is an elongated strip wrapped around the inner hose;
said elongated strip has a gap located between edges of the strip to allow for bending of the inner hose;
inner rings connected to the ends of the inner hose; and
the abrasion-resistant middle layer located between the braided covering and the inner hose terminating a predetermined distance from the ends of the inner hose to leave space for the inner rings to be connected to the ends of the inner hose.

9. The abrasion-resistant braided hose of claim 8 wherein:
the abrasion-resistant middle layer is made of polytetrafluoroethylene.

10. The abrasion-resistant braided hose of claim 8 wherein:
said elongated strip having a thickness and width that prevents the elongated strip from conforming to any convolution spaces located on the inner hose.

11. The abrasion-resistant braided hose of claim 8 further comprising:
inner rings connected to the ends of the inner hose.

12. The abrasion-resistant braided hose of claim 8 further comprising:
braid rings connected to the ends of the braided covering.

13. The abrasion-resistant braided hose of claim 8 further comprising:
end fittings secured to the ends of the abrasion-resistant braided hose.

14. An abrasion-resistant braided hose comprising:
an elongated inner hose having two ends;
an outer braided covering surrounding the inner hose;
an abrasion-resistant middle layer located between the braided covering and the inner hose;
the abrasion-resistant middle layer is an elongated strip wrapped in a spiral pattern around the inner hose;
said elongated strip wrapped in a spiral pattern around the inner hose has a gap located between edges of the strip to allow for bending of the inner hose;
inner rings connected to the ends of the inner hose; and
the abrasion-resistant middle layer located between the braided covering and the inner hose terminating a predetermined distance from the ends of the inner hose to leave space for the inner rings to be connected to the ends of the inner hose.

15. The abrasion-resistant braided hose of claim 14 wherein:
said elongated strip having a thickness and width that prevents the elongated strip from conforming to any convolution spaces located on the inner hose.

16. The abrasion-resistant braided hose of claim 14 wherein:
the abrasion-resistant middle layer is made of polytetrafluoroethylene.

17. The abrasion-resistant braided hose of claim 14 further comprising:
inner rings connected to the ends of the inner hose.

18. The abrasion-resistant braided hose of claim 14 further comprising:
braid rings connected to the ends of the braided covering.

19. The abrasion-resistant braided hose of claim 14 further comprising:
end fittings secured to the ends of the abrasion-resistant braided hose.

* * * * *